US008675103B2

(12) United States Patent
Cieslinski

(10) Patent No.: US 8,675,103 B2
(45) Date of Patent: Mar. 18, 2014

(54) IMAGE SENSOR

(75) Inventor: Michael Cieslinski, Ottobrunn (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 305 days.

(21) Appl. No.: 13/298,756

(22) Filed: Nov. 17, 2011

(65) Prior Publication Data

US 2012/0127354 A1 May 24, 2012

(30) Foreign Application Priority Data

Nov. 19, 2010 (DE) .......................... 10 2010 051 986

(51) Int. Cl.
H04N 5/20 (2006.01)
H04N 5/235 (2006.01)

(52) U.S. Cl.
USPC ....................... 348/255; 348/230.1; 348/229.1

(58) Field of Classification Search
USPC ................... 348/230.1, 255, 229.1, 300–302, 348/307–310; 257/291–293
See application file for complete search history.

(56) References Cited

U.S. PATENT DOCUMENTS

| 5,790,191 | A | 8/1998 | Zhang | |
|---|---|---|---|---|
| 7,443,435 | B2 | 10/2008 | Loose | |
| 7,692,693 | B2 * | 4/2010 | Misawa | 348/229.1 |
| 7,821,555 | B2 * | 10/2010 | Rossi | 348/300 |
| 7,995,124 | B2 * | 8/2011 | Dai | 348/300 |
| 2005/0259167 | A1 * | 11/2005 | Inoue et al. | 348/300 |
| 2008/0079841 | A1 | 4/2008 | Cieslinksi | |
| 2008/0218619 | A1 | 9/2008 | Egawa | |
| 2009/0073274 | A1 | 3/2009 | Dai | |
| 2009/0167915 | A1 | 7/2009 | Hirota et al. | |
| 2009/0273695 | A1 | 11/2009 | Mabuchi | |
| 2009/0322903 | A1 | 12/2009 | Hashimoto et al. | |
| 2010/0073538 | A1 | 3/2010 | Cieslinski | |
| 2010/0097317 | A1 | 4/2010 | Li et al. | |
| 2010/0177225 | A1 | 7/2010 | Cieslinski | |
| 2011/0279722 | A1 | 11/2011 | Cieslinski et al. | |

FOREIGN PATENT DOCUMENTS

| DE | 10 2007 045 488 A1 | 4/2009 |
|---|---|---|
| DE | 10 2007 058 973 A1 | 6/2009 |
| DE | 10 2009 004 187 A1 | 7/2010 |
| DE | 10 2009 019 034 A1 | 10/2010 |

OTHER PUBLICATIONS

German Search Report dated Jul. 1, 2011 relating to DE No. 10 2010 051 986.3.
European Search Report dated Jan. 10, 2013 relating to EP application No. 11 009 092.5.

* cited by examiner

*Primary Examiner* — Lin Ye
*Assistant Examiner* — Euel Cowan
(74) *Attorney, Agent, or Firm* — Gifford, Krass, Sprinkle, Anderson & Citkowski, P.C.

(57) ABSTRACT

An image sensor for electronic cameras includes a plurality of light sensitive pixels arranged in rows and columns for generating exposure proportional signals, wherein the pixels of a respective column are coupled to at least one respective column read-out circuit via at least one respective column line, and wherein the respective column read-out circuit includes at least two column amplifiers which are connected in parallel, and includes a control device for controlling a read-out process of an image, wherein the read-out process for the respective pixel includes at least one read-out cycle. The gain factor of at least one of the two column amplifiers of the respective column read-out circuit is adjustable.

28 Claims, 6 Drawing Sheets

IMAGE SENSOR

CROSS-REFERENCE TO RELATED APPLICATIONS

This application claims priority of German Patent Application DE 10 2010 051 986.3 filed Nov. 19, 2010.

FIELD OF THE INVENTION

The present invention relates to an image sensor, in particular to a CMOS image sensor, for electronic cameras, having a plurality of light sensitive pixels arranged in rows and columns for generating exposure proportional signals, wherein the pixels of a respective column are coupled to at least one respective column read-out circuit via at least one respective column line, and wherein the respective column read-out circuit includes at least two column amplifiers which are connected in parallel, and having a control device for controlling a read-out of an image, wherein a read-out process for a respective pixel includes at least one read-out cycle.

BACKGROUND OF THE INVENTION

An electronic camera can, for example, be used to digitally record image sequences which are later shown in a cinema. It is advantageous in this respect if the camera has high light sensitivity and simultaneously a high dynamic range. These two properties increase the quality of the recording and they help to reduce the costs for the illumination of the scene, for example.

In electronic cameras, the light sensitive elements or pixels convert light incident through an objective of the camera into electric signals. Each of the pixels is addressed to read out an image, with a pixel corresponding to a picture element of the image. The pixels arranged in rows and columns form an image field of the image sensor. A signal which is proportional to a charge of the pixel collected by an exposure is conducted to a data output of the image sensor.

Image sensors are in particular known which have a separate row selection line for each row and a separate column line for each column. The read-out of such an image sensor takes place row-wise, i.e. row for row. For this purpose, the pixels of the respective row are switched to the column lines by means of the respective row selection line. The column lines (also called bit lines) form the column bus. A separate column amplifier is usually associated with each of the column lines. A respective single column amplifier can, however, also be associated with a plurality of column lines. The column amplifiers are provided for the purpose of amplifying the signals of the pixels of the selected row applied to the column lines. The amplified signals are then clocked out, i.e. transferred from the column amplifiers to the data output or, if a plurality of data outputs are provided as is as a rule the case for reaching a higher frame rate, to the data outputs of the image sensor.

A separate data output is in this respect also as a rule not provided for each column line and/or for each column amplifier with a plurality of data outputs since a substantial space requirement and thus cost expense is associated with every data output. A multiplex device is therefore provided as a rule between column amplifiers and data outputs. For example, 32 data outputs (per channel) can be provided for an image sensor having 2880×2160 pixels. The number of data outputs is as a rule therefore smaller than the number of column lines.

To increase the dynamic range of the image sensor, provision can now be made that the signals of the pixels are read out by two or more channels which are separate from one another and which amplify the signals by different amounts, with each channel having a separate column amplifier and with the gain factors of the column amplifiers of the channels differing from one another. In such a case, the image sensor can include e.g. 2×32 data outputs, with the same column lines and/or column amplifiers being associated with the respective data output of the second channel as with the associated data output of the first channel.

The two channels can then be read out independently of one another and combined, with an image with a higher dynamic range arising overall. This is shown in FIGS. 1a and 1b. The combination of the amplified signals of two channels, of which one channel 101 has a high gain and one channel 103 has a low gain, takes place such that with a short exposure the amplified signal of the channel 101 with the high gain underlies an output value 105 and with a long exposure the amplified signal of the channel 103 with the low gain underlies an output value 105 for the respective picture element associated with the two channels 101, 103.

At the transition between short and long exposure, a simple switchover between the two channels 101, 103 is as a rule not sufficient since, due to the occurrence of manufacture-induced offset voltages which can usually not be avoided and/or deviations from the desired gains at the transition, a jump 107 in the exposure-output value characteristic would occur such as is shown in FIG. 1b. A cross-fading therefore usually takes place in a transition region 109 around the transition by which both the amplified signal of the channel 101 and the amplified signal of the channel 103 are taken into account, with the two signals being offset with respect to one another such that a gentle transition arises such as is shown in the enlarged representation of the transition in FIG. 1b.

In the aforesaid example with 2880×2160 pixels and 2×32 data outputs, 90 read-out cycles are required to clock out the signals of the pixels of a row in two channels, provided that the read-out process includes precisely one read-out cycle for the respective pixel. The read-out of a row therefore requires 1.8 µs with a read-out clock frequency of 50 MHz. 3.888 ms are therefore required for the reading out of a whole image, i.e. of 2160 rows. A maximum frame rate of 257 Hz is thus possible.

An increase in the frame rate can generally be achieved in that the read-out clock frequency and/or the number of data outputs per channel is/are increased. An increase in the read-out clock frequency is, however, as a rule only possible if the respective next technology generation is used. An increase in the number of data outputs per channel is very cost-intensive.

SUMMARY OF THE INVENTION

It is the underlying object of the invention to provide an image sensor which enables an inexpensive increase in the frame rate and/or in the dynamic range.

This object is satisfied by an image sensor having the features of claim 1, and in particular in that the gain factor of at least one of the two column amplifiers of the respective column read-out circuit is adjustable, and in that the image sensor includes a first operating manner and a second operating manner, wherein in the first operating manner the two column amplifiers have different gain factors for a respective read-out cycle and the signal of a pixel of a row is amplified by the two different gain factors, and wherein in the second operating manner the two column amplifiers have the same gain factor for a respective read-out cycle and the signals of two pixels of two different rows are amplified by the same gain factor.

In accordance with the invention, the image sensor, in particular the control device, is adapted to switch over between the first operating manner in which the pixels of the image sensor are read out in two channels and the second operating manner in which the pixels of the image sensor are read out in one channel.

With an image sensor having 2880×2160 pixels and 2×32 data outputs, only 45 read-out cycles are required in the second operating manner to read out a complete image. With a read-out clock frequency of 50 MHz, a complete image can thus be read out in only 1.944 ins (0.9 µs×2160). In the second operating manner, a frame rate of 514 Hz can thus be achieved. The increased dynamics acquired by the two-channel read-out are dispensed with on such a one-channel read-out. This is, however, not of disadvantage for slow-motion shots in which such a one-channel read-out can be used since with such shots the scene is typically anyway illuminated and the contrasts arising in the image are reduced by the lighting.

A read-out cycle is a cycle of a periodic clock signal having a read-out clock frequency, in which cycle the signal of a pixel applied at a column amplifier is transferred to a unit, in particular to a data input, arranged after the column amplifier. A plurality of read-out steps can be provided within a read-out cycle which are carried out in the respective pixel or in the respective column read-out circuit, for example to carry out a plurality of charge transfers in the respective pixel or to transfer the charge generated in the pixel in a plurality of portions to the column amplifier or to associated signal stores.

In accordance with an embodiment of the invention, the image sensor includes at least two of the following operating manners: a normal mode in which the image sensor is operated only in the first operating manner, a high-speed mode in which the image sensor is only operated in the second operating manner, and a high-dynamic mode in which the image sensor is first operated in the second operating manner and subsequently in the first operating manner. In the normal mode, reading out therefore takes place at normal speed and with two channels. A fast one-channel read-out takes place in the high-speed mode. The high-dynamic mode combines the two operating manners and allows an increase in the dynamic range of the image sensor with respect to an operation in the normal mode by an intermediate read-out, in particular a multiple intermediate read-out, in particular a partial fast one-channel intermediate read-out, as is explained in more detail below.

The reading out process preferably includes a single read-out cycle in the normal mode and/or in the high-speed mode, and/or a plurality of read-out cycles in the high-dynamic mode.

The high-dynamic mode further preferably includes at least two read-out cycles in the second operating manner, in particular for a fast intermediate read-out, and/or only one read-out cycle in the first operating manner, in particular for a subsequent normal reading out. In particular in the high-dynamic mode, only one final read-out cycle, in which the image sensor is preferably operated in the first operating manner, allows a complete reading out of the charge present in the pixel, with the last read-out cycle preferably only comprising a read-out step.

The gain factor of the first of the two column amplifiers in the first operating manner is preferably larger than the gain factor of the second of the two column amplifiers. The gain factor of the second of the two column amplifiers in the first operating manner can in particular correspond to the gain factor of the two column amplifiers in the second operating manner.

In accordance with another embodiment of the invention, the column read-out circuit includes a plurality of signal stores for exposure signals, with at least one signal store for exposure signals, in particular at least two signal stores for exposure signals, being connected before the first of the two column amplifiers and with at least two signal stores for exposure signals, in particular at least four signal stores for exposure signals, being connected before the second of the two column amplifiers, with the at least two memory stores for exposure signals or the at least four signal stores for exposure signals preferably being connected to one another in parallel.

The capacity of the signal store or the sum of the capacities of the signal stores for exposure signals connected before the first column amplifier preferably corresponds to the sum of the capacities of the signal stores for exposure signals connected before the second column amplifiers. The signal stores for exposure signals associated with the first column amplifier preferably each have the same capacity and/or the signal stores for exposure signals associated with the second column amplifier preferably each have the same capacity.

At least one signal store for a reference signal can be connected before the two column amplifiers, in particular a separate reference signal store can be connected before each of the two column amplifiers, with the capacity of the respective reference signal store preferably corresponding to the slim of the capacities of the signal stores for exposure signals connected before the first column amplifier or corresponding to the sum of the capacities of the signal stores for exposure signals connected before the second column amplifier. A correlated double sampling is hereby made possible to suppress the thermal noise of the image sensor.

The column read-out circuit preferably includes first switch means to connect the respective column line selectively to one or more of the signal stores. The column read-out circuit preferably includes second switch means to connect the signal stores for exposure signals associated with the first column amplifier and/or with the second column amplifier in each case together to the associated column amplifier.

The respective pixel in particular includes a light sensitive detector element (e.g. a pinned diode) to generate electric charge from incident light, a read-out node, a transfer gate to which a transfer control pulse can be applied to enable a charge transfer from the detector element to the read-out node, a converter circuit (e.g. a converter FET) to generate a measured signal which is proportional to a charge present in the read-out node, and a reset device to reset a charge present in the read-out node to a reference value, with the control device being designed for controlling the transfer gate and the reset device of the respective pixel.

To ensure a high light sensitivity in an image sensor having such pixels, it is necessary that the charges generated in the detector element by the incident light effect a high voltage at the gate of the converter FET (field effect transistor). This is achieved in that the capacitance of the read-out node is kept small. With a capacitance of, for example, 2 fF, each electron effects a voltage change of 80 µV. If the camera has thermal noise of e.g. 240 µV, 3 electrons or 5 photons are thus already detectable. This corresponds to the noise limit of the respective pixel. Such an image sensor admittedly thus has a high light sensitivity, but only a small dynamic range. With the aforesaid capacitance of 2 fF, the read-out node is already completely filled with approximately 12,000 electrons. 12,000 electrons effect a voltage of approximately 1 V, whereby the limit of the electrical range is reached which can be forwarded to the outputs. Taking the noise limit (3 electrons) into account, maximum achievable dynamics of 4,000:1 result. A photographic film, in contrast, has a dynamic of more than 10,000:1.

It is in particular therefore preferred if the control device is adapted to read out the charge generated in the pixel for the respective read-out cycle from the pixel in a plurality of read-out steps, and thus in a plurality of portions, to store the part-value measured signals proportional to the individual charge portions separately from one another in the signal stores connected before the first signal amplifier or before the second signal amplifier. By the step-wise reading out, the dynamics of the image sensor can be increased with respect to the dynamics associated with a single-step reading out by a factor which corresponds to the number of read-out steps or of the aforesaid charge transfer. If the charge generated in the aforesaid detector element based on, for example, four read-out steps or charge transfers is read out, the dynamics can be increased by the factor four. If the aforesaid read-out node has a saturation limit of, for example, 12,000 electrons and if the detector element has a saturation limit of 48,000 electrons, dynamics of 16,000:1 are achieved with a noise level of three electrons. If the detector element has an even higher saturation limit, the dynamics can be increased even further by a reading out divided more than fourfold. Since the capacitance of the read-out node does not have to be changed for this purpose, a high light sensitivity is maintained. Reading out can generally also only take place in two or three steps.

In a normal mode, the read-out process preferably includes a single read-out cycle and the control device is adapted to store the part-value measured signals proportional to the individual charge portions separately from one another in the signal stores connected before the second column amplifier and additionally to store the part-value measured signal belonging to the last read-out step in the one signal store, or the at least two signal stores, connected before the first column amplifier.

A plurality of read-out steps preferably only take place in the second operating manner in a high-dynamic mode.

In particular only the last read-out step allows a complete read-out of the charge present in the pixel in a normal mode and/or in a high-speed mode.

The number of signal stores for exposure signals connected before the second column amplifier preferably corresponds to the number of read-out steps.

In accordance with another embodiment of the invention, the read-out process includes a plurality of read-out cycles in a high-dynamic mode, with the read-out cycle or cycles lying before the last read-out cycle taking place during the exposure process for the image, and with the control device being adapted to read out from the pixel the charge generated in the pixel for the respective read-out cycle, optionally in a plurality of read-out steps, and thus in a plurality of portions, to store a measured signal proportional to the charge in the one signal store for exposure signals or in the at least two signal stores for exposure signals connected before the first column amplifier or in the signal stores for exposure signals connected before the second column amplifier.

Provision is therefore made in particular not only to read out the aforesaid detector element once and at the end of the exposure procedure, but also additionally before it during the still ongoing exposure procedure. A plurality of read-out cycles are provided for a single exposure process, with the aforesaid transfer gate first being closed for each read-out cycle (while charge is generated in the aforesaid detector element) and the transfer gate being temporarily opened by a brief transfer control pulse to allow a transfer of a charge to the aforesaid read-out node. A read-out result is generated (e.g. by switching a voltage signal corresponding to the respective charge in the read-out node to the aforesaid column line; by storing the voltage signal in a capacitor; by amplifying the voltage signal; and by transferring the amplified voltage signal to a data output) for each read-out cycle based on the charge thus transferred to the read-out node. The aforesaid reset device is briefly activated between two transfer control pulses following one another, i.e. after the generation of a read-out result or before the application of the next transfer control pulse. Since charge can be cancelled in the respective pixel with a read-out cycle taking place before the last read-out cycle and thus "space" can be provided for further charge carriers, the charge quantity can be considerably increased which can be read out in total from the respective pixel during a single exposure process. The read-out results of the individual read-out cycles can in particular be applied against one another, for example added, optionally with different weightings, to determine a read-out value for the charge generated in the respective pixel during the exposure process. The saturation limit is hereby increased and thus the maximum gainability or the maximum possible exposure of the respective pixel.

The transfer gate is preferably not completely opened during the intermediate read-out steps. No charge is thereby read out when the pixel only contains a fraction, for example less than 10%, of the maximum charge. The noise is thus not increased at low exposure since ultimately only a single read-out result—namely the last read-out result of the respective exposure process—is used.

The number of read-out cycles is preferably an odd number and/or at least one pair or one respective pair of read-out cycles lying before the last read-out cycle is distributed symmetrically about the time center of the respective exposure process.

The control device is preferably adapted to vary a control pulse applied to the pixel in order selectively to allow a partial or complete reading out of the charge present in the pixel.

The control device is in particular adapted to clock out two images in a time-overlapping manner and/or to clock out the signals of the pixels of two different rows of different images in the second operating manner.

Provision can furthermore be made that the two different rows to be amplified with a respective read-out cycle and associated with both pixels do not follow one another directly and/or have a constant row interval from one another in the second operating manner.

The invention furthermore relates to a corresponding method for the reading out of an image sensor, in particular of a CMOS image sensor, for electronic cameras. Preferred embodiments of the method in accordance with the invention result in an analog manner from the preferred embodiments of the image sensor in accordance with the invention.

BRIEF DESCRIPTION OF THE DRAWINGS

Non-restricting embodiments of the invention are shown in the drawing and will be described in the following. There are shown, schematically in each case.

DETAILED DESCRIPTION OF THE PREFERRED EMBODIMENTS

Figure 2:
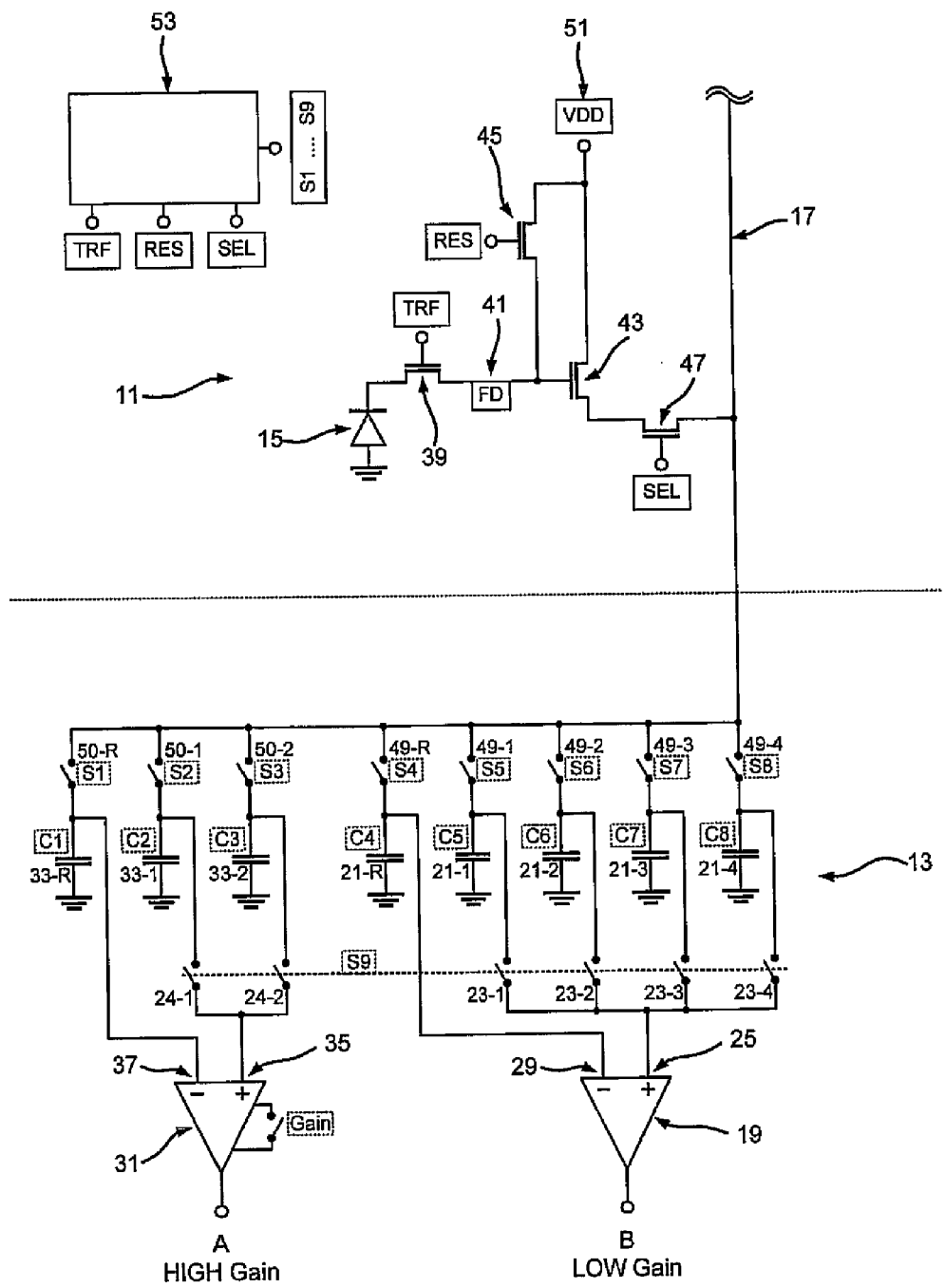
FIG. 2 a 4-transistor CMOS image sensor, where, of the image sensor, only one pixel with a detector element and a column amplifier associated with the pixel are shown.

The image sensor in accordance with the invention shown in FIG. 2 comprises 2880×2160 pixels of which only one single pixel 11 is shown as a representative. The image sensor furthermore includes 2×32 data outputs and is operated at a predefined read-out clock frequency of 50 MHz.

The pixel 11 shown in FIG. 2 includes a light-sensitive detector element in the form of a so-called pinned diode (PD) 15 which is charge coupled via a transfer gate 39 to a read-out node 41 which is made as a so-called floating diffusion (FD). The read-out node 41 is connected to the gate of a converter field effect transistor (FET) 43 which is made as a source follower and which represents a charge voltage converter circuit. Furthermore the read-out node 41 is connected via a reset FET 45 to a positive voltage supply 51. One of the two channel connections of the converter FET 43 is likewise connected to the positive supply 51, whereas the other of the two channel connections of the converter FET 43 is connectable via a selection FET 47 which acts as a row selection switch to a column line 17 associated with the pixel 11 shown.

The column line 17 is provided to connect the pixels arranged in the associated column to a column read-out circuit 13. The respective column read-out circuit 13 includes a first column amplifier, in particular a difference amplifier 31, and a second column amplifier, in particular a different amplifier 19, which are connected to one another in parallel. Two column amplifiers (difference amplifiers 31, 19) are therefore associated with a single respective column line 17. The gain factor of the first difference amplifier 31 is adjustable. The respective column read-out circuit 13 furthermore comprises first switches 50, 49, capacitors 33, 31 and second switches 24, 23.

Two capacitors for exposure signals 33-1, 33-2 connected to one another in parallel are connected before the first difference amplifier 31 and are connectable via first switches 50-1, 50-2 to the column line 17. Furthermore, second switches 24-1, 24-2 are provided for the two capacitors 33-1, 33-2. The two capacitors 33-1, 33-2 are connected to one another via the second switches 24-1, 24-2 and are simultaneously connectable to the positive input 35 of the first amplifier 31. Furthermore, a capacitor for a reference signal 33-R is connected before the first amplifier 31 and can be connected to the column line 17 via a first switch 50-R. The negative input 37 of the first amplifier 31 is connected to the reference signal capacitor 33-R.

Four capacitors for exposure signals 21-1, 21-2, 21-3, 21-4 which are connected in parallel to one another and which can be connected via first switches 49-1, 49-2, 49-3, 49-4 to the column line 17 are connected before the second amplifier 19. Furthermore, second switches 23-1, 23-2, 23-3, 23-4 are provided for the capacitors 21-1, 21-2, 21-3, 21-4. The four capacitors 21-1, 21-2, 21-3, 21-4 are connectable to one another via the second switches 23-1, 23-2, 23-3, 23-4 and are simultaneously connectable to the positive input 25 of the second amplifier 19. Furthermore, a capacitor for a reference signal 21-R is connected before the second amplifier 19 and can be connected to the column line 17 via a first switch 49-R. The negative input 29 of the second amplifier 19 is connected to the reference signal capacitor 21-R.

The two capacitors 33-1, 33-2 have the same capacitance, for example 0.5 pF in each case. The four capacitors 21-1, 21-2, 21-3, 21-4 likewise have the same capacitance, for example 0.25 pF in each case. The sum of the capacitances of the capacitors 33-1, 33-2 therefore corresponds to the sum of the capacitances of the capacitors 21-1, 21-2, 21-3, 21-4. The two reference signal capacitors 33-R, 21-R each have a capacitance which corresponds to the sum of the capacitances of the capacitors for exposure signals 33 associated with the first amplifier 31 or which corresponds to the sum of the capacitances of the capacitors for exposure signals 21 associated with the second amplifier 19, for example 1 pF.

In addition, the image sensor includes a control device 53 which controls the transfer gate 39 (via a control line TRF), the reset FET 45 (via a control line RES), the selection FET 47 (via a control line SEL), the first switches 50, 49 (via the control lines S1 to S8), the second switches 24, 23 (via the control line S9) and the gain factor of the first amplifier 31 (via the control line Gain).

The first amplifier 31 forms a first channel A (together with the associated capacitors and switches). The first amplifier 19 forms a second channel B (together with the associated capacitors and switches).

Figure 3:
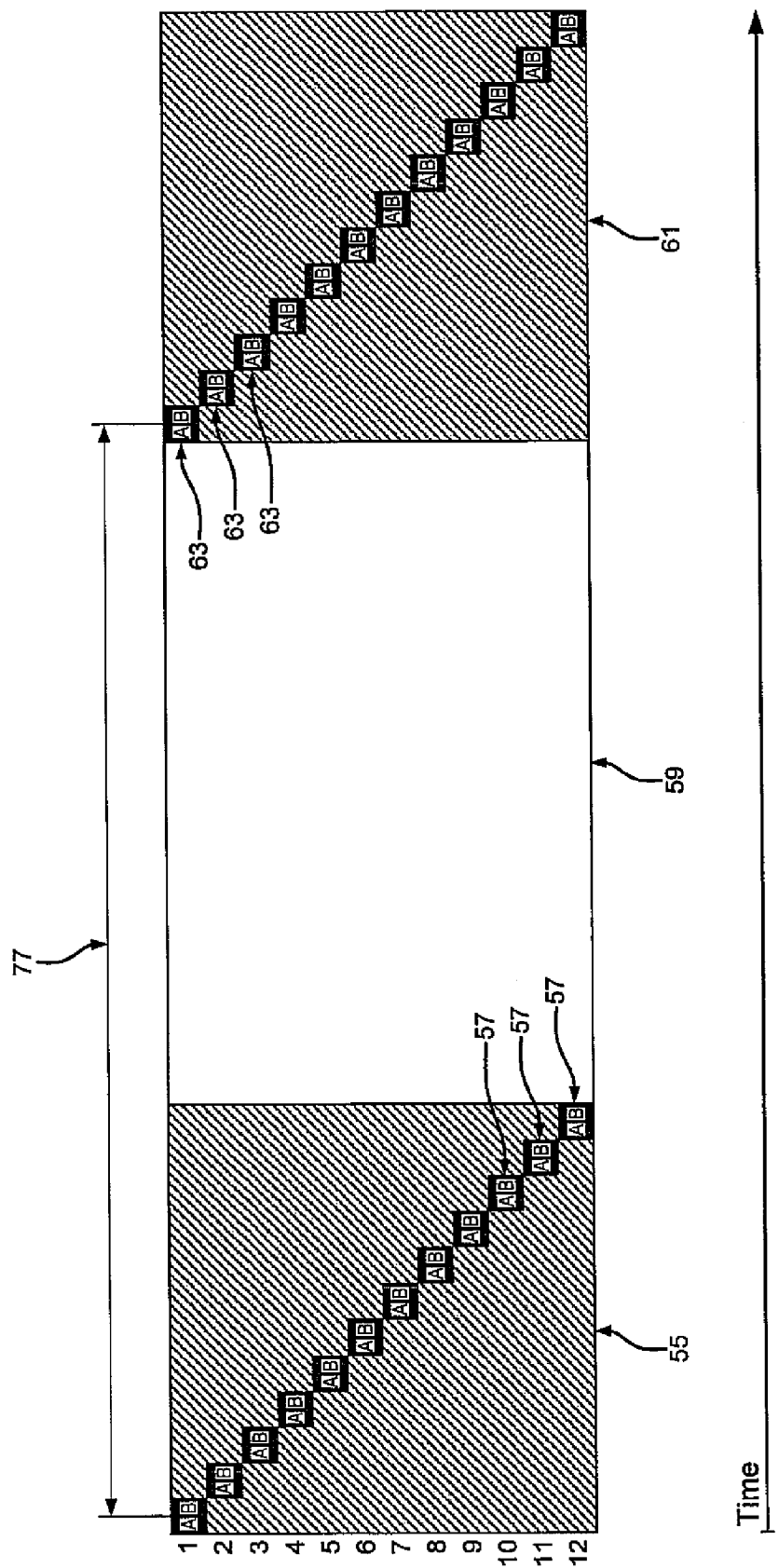
FIG. 3 a timing diagram of the read-out process of the image sensor in a normal mode.
Figure 4:
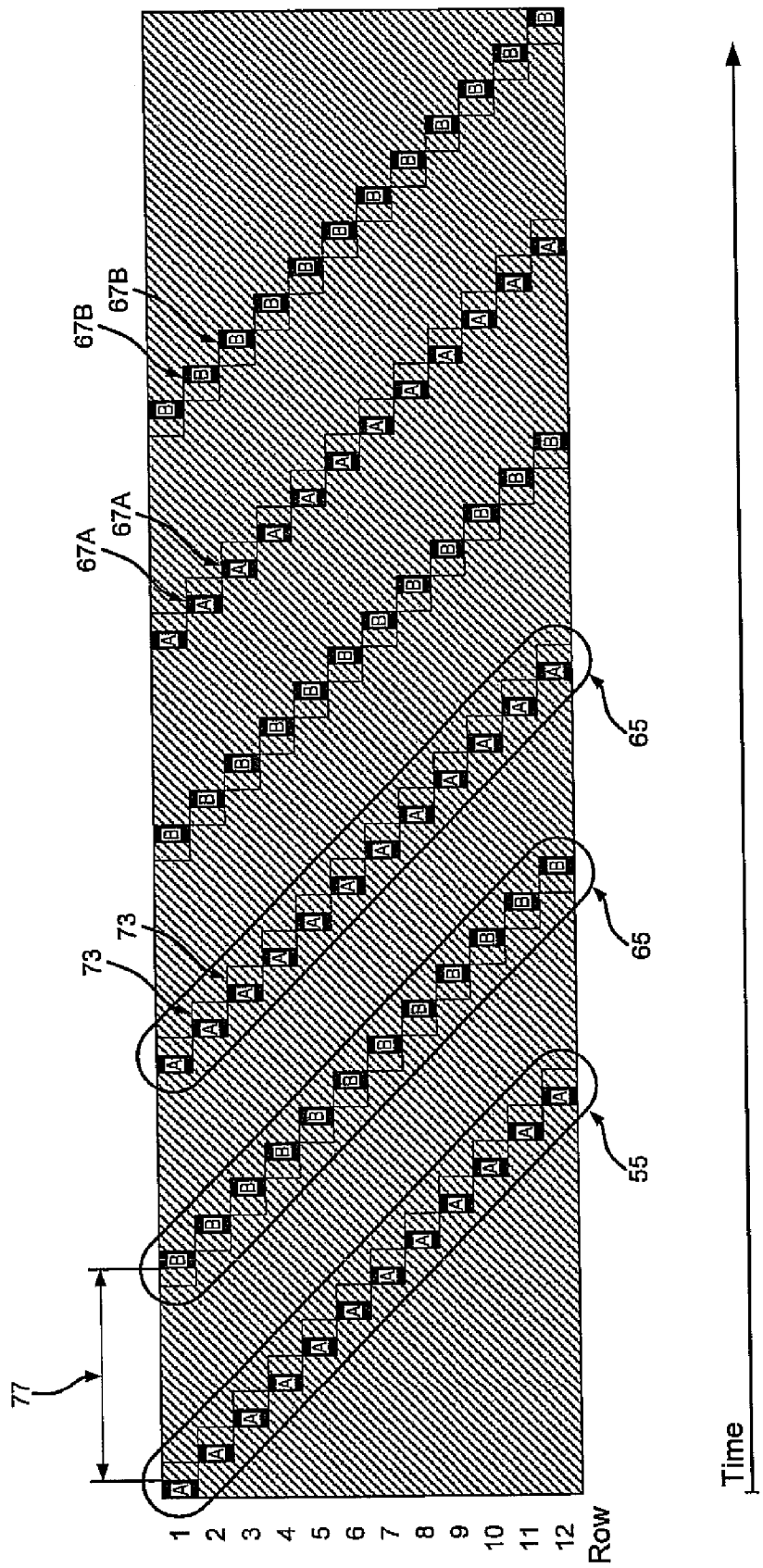
FIG. 4 a timing diagram of the read-out process of the image sensor in a high-speed mode (fast reading out)
Figure 5:
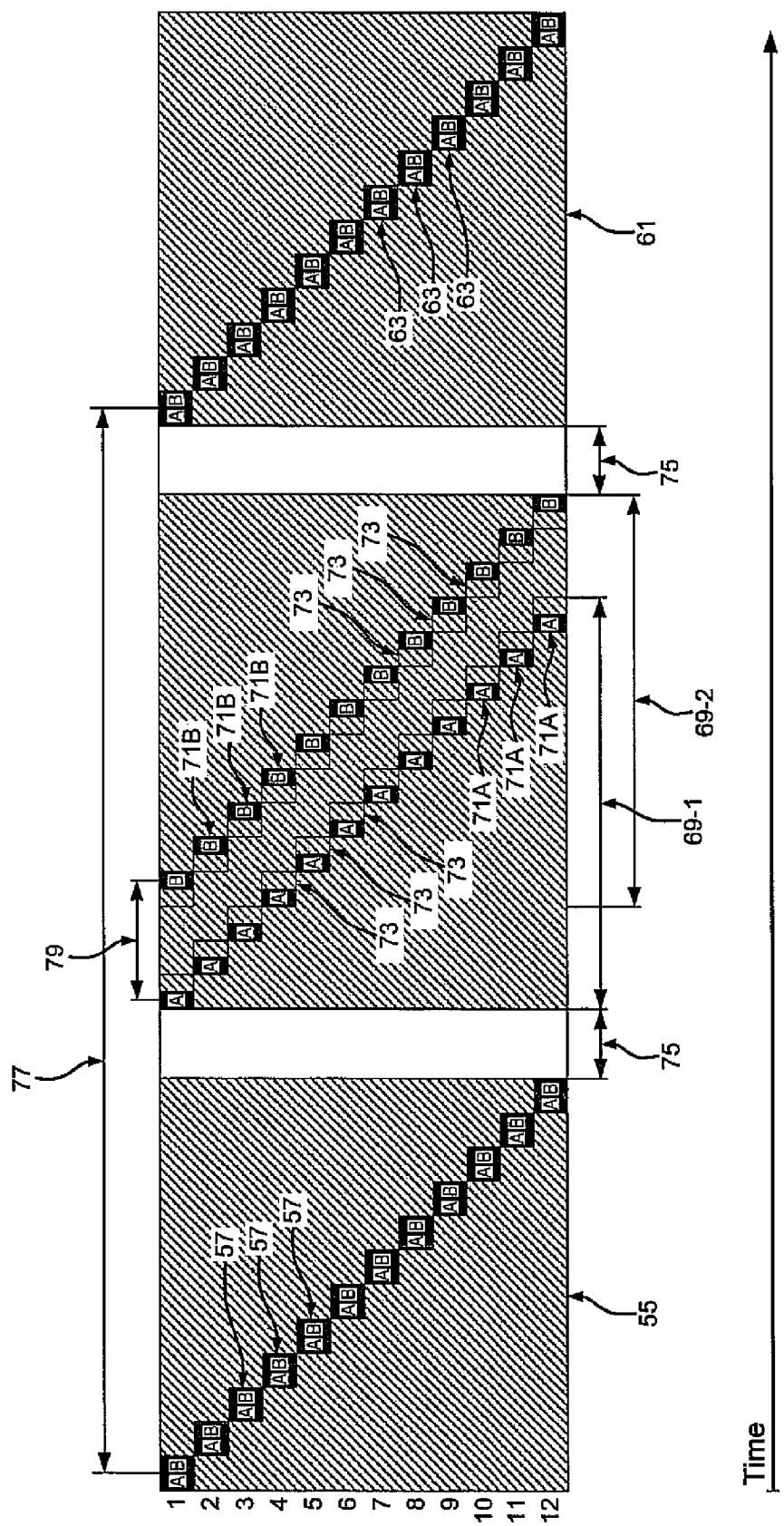
FIG. 5 a timing diagram of the read-out process of the image sensor in a high-dynamic mode (with fast partial intermediate reading out)

Timing diagrams for the reading out of an image in the different operating manners of the image sensor are shown in FIGS. 3 to 5. A reading out is in particular to be understood as the reading out of the charges present in the pixels 11 into the capacitors 33, 31 connected before the amplifiers 31, 19. A clocking out is to be understood as the transfer of the signals applied at the amplifiers 31, 19 to a unit disposed after the amplifiers 31, 19, in particular downstream data outputs. The clocking out is in particular an element of the reading out. In the timing diagrams, only 12 rows are shown as representatives for all rows of the image sensor.

A reset 55 (such as is described in the following in connection with a reset 5 of the normal mode) first takes place before the reading out in each of the different operating manners and its length for all rows amounts in total, for example, to 4 ms, with the reset being carried out in row-sequential manner, i.e. row for row. The time period for the reset is chosen analog to the time period of the reading out 51 (see below). The time period for the proportional reset 57 of a row then amounts to 1.8 μs, for example. The reset takes place to completely remove charge from the pinned diode 15 and from the read-out node 41. The pixel 11 is thus "empty" and an exposure process can start.

In the normal mode in accordance with FIG. 3, a (normal) reading out 61 takes place whose duration amounts to 4 ms in total after a waiting time 59 of, for example, 6 ms, i.e. at the end of an exposure time 77 of a total of 10 ms. A reading out of signals does not take place for any of the pixels during the waiting time 59 (no hatching in FIG. 3). The time duration for the reading out 61 depends—with a predefined number of data outputs and a predefined number of rows—on the (maximum) read-out clock frequency (as was explained above). The time duration for the proportional reading out 63 of a row can then, for example, amount to a maximum of approximately 1.8 μs. In this time, the signals of the pixels 11 of the respective row are applied to the amplifiers 31, 19 of the column read-out circuit 13 (as is described in the following). The reading out takes place in turn in a row-sequential manner (i.e. row for row) to allow the same exposure time for all rows. A further exposure process can take place directly subsequently or only after the end of a break interval after the reading out 61 shown in FIG. 3 in dependence on the desired exposure time and on the frame rate. In any case, the next exposure process is initiated by a repeat "emptying" of the pixels 11. This can take place within the reading out 61 shown in FIG. 3 or by a later, separate reset 55.

At the end of the proportional reading out 63 of the respective row, the signals of the row applied at the amplifiers 31, 19 of the column read-out circuits 13 are then clocked out. In this respect, the control device 53 controls the control lines such that the two amplifiers 31, 19 of the respective column read-out circuit 13 amplify the signal of a pixel 11 of a row by two different gain factors, with the gain factor of the first amplifier 31 being larger (HIGH Gain) than the gain factor of the second amplifier 19 (LOW Gain). The first amplifier 31 (channel A) has a high gain for a low exposure, the second amplifier 19 (channel B) has a normal gain for a normal and high exposure. The proportional reading out 63 of a respective row shown in FIG. 3 includes the reading out of the two channels A and B.

This is a first operating manner of the image sensor in which each pixel 11-2 is read out in two channels, i.e. channel A and channel B are used for each pixel 11. To clock out the respective row completely (i.e. a total of 2880 pixels), a total of 90 read-out cycles are required. 32 pixels are clocked out per read-out cycle, with the two channels A and B being clocked out in parallel.

In the following, the read-out process of an image in the normal mode of the image sensor will be described by way of example based on a 3.3 V CMOS technology, with the charge generated in the pinned diode 15 and present at the end of an exposure process or after an exposure process being read out from the pixel 11 in four read-out steps or in a plurality of portions.

The pinned diode 15 is filled with charge at the end of an exposure process or after an exposure process. The read-out node 41 can likewise contain a small quantity of "unwanted" charge which was generated there by leak currents and/or scattered light. A voltage of 3.3 V is therefore first applied to the control line RES for the reading out. The unwanted charge which may have been generated in the read-out node 41 during the exposure process can thereby flow off from the read-out node 41 to the positive supply voltage 51 (Reset 1). It is hereby ensured that the read-out node 41 does not already contain charge before a first read-out step such as is described in more detail directly in the following.

A voltage of 2.5 V is then briefly applied by means of a first transfer control signal to the control line TRF so that a first portion of the charge generated in the pinned diode 15 can flow into the read-out node 41 (Transfer 1).

Then the control line SEL is placed onto a voltage of 3.3 V and the first switch 49-1 is closed. The voltage level generated by the charge present in the read-out node 41 via the converter FET 43 is thereby switched to the column path 17 via the selection FET 47 and is thus conducted to the capacitor 21-1 (Read Signal 1). After the system has undergone transient oscillation, the capacitor 21-1 is again separated from the pixel 11 by opening the first switch 49-1 so that an analog first part-value voltage signal is stored in the capacitor 21-1 in the form of a corresponding charge, said part-value voltage signal being proportional to the charge present in the read-out node 41 after the first charge transfer.

Subsequently, the above-explained steps "Reset 1", "Transfer 1" and "Read Signal 1" are carried out a second time (Reset 2, Transfer 2, Read Signal 2) and a third time (Reset 3, Transfer 3, Read Signal 3) to read further charge portions out of the pinned diode 15 and to store the part-value voltage signals corresponding to the read out charge portions in the further capacitors 21-2, 21-3, with the first switch 21-2 and 21-3 respectively being used instead of the first switch 21-1. A voltage of 2.7 V is applied to the control line TRF for the second charge transfer and a voltage of 2.9 V for the third charge transfer.

Afterward, the control line RES is briefly set to a voltage of 3.3 V so that the charge can flow off from the read-out node 41 to the positive supply 51 (Reset 4). It is hereby ensured that the read-out node 41 does not already contain charge before the generation of a reference value voltage signal as will be described in the following.

Subsequently—now without a repeat application of a transfer control signal at the control line TRF—the first switches 50-R, 49-R are closed. The voltage level of the read-out node 41 is thereby switched via the converter FET 43 and the selection FET 47 to the column path 17 and is thus conducted to the reference signal capacitors 33-R, 21-R (Read Reference). After the system has undergone transient oscillation, the reference value capacitors 33-R, 21-R are again separated from the pixel 11 by opening the first switches 50-R, 49-R.

In a next step, the control line TRF is briefly set to the full voltage of 3.3 V by means of a fourth transfer control signal. The total residue of the charge generated in the pinned diode 15 can thereby flow into the read-out node 41 (Transfer 4).

The first switches 50-1, 50-2, 49-4 are then closed. The voltage level of the read-out node 41 effected by the fourth charge transfer is thereby switched via the converter FET 43 and the selection FET 47 to the column path 17 and is thus conducted both to the capacitors 33-1, 33-2 and to the capacitor 21-4. After the system has undergone transient oscillation, the capacitors 33-1, 33-2, 21-4 are again separated from the pixel 11 by opening the first switches 50-1, 50-2, 49-4 so that a respective analog part-value voltage signal is stored in the capacitors 33-1, 33-2, 21-4 and is proportional to the charge present in the read-out node 41 after the fourth charge transfer.

The control line SEL is then set to 0 V again. The control lines RES and TRF are set to a voltage of 3.3 V. Then the charge located in the read-out node 41 (and any residual charges located in the pinned diode 15) is (are) removed. Subsequently, the control lines RES and TEF are again set to 0 V (Reset 5). The pixel is again "empty" and the next exposure procedure can begin.

Finally all second switches 24, 23 are closed. The starting voltages which are now generated by the amplifiers 31, 19 are conducted to a common analog/digital converter or to separate analog/digital converters and are digitized there. By subtracting the reference value voltage signal, i.e. the voltage signal of the empty read-out node 41, from the total value voltage signal (at the second amplifier 19) or from the part-value voltage signal of the fourth charge transfer (at the first amplifier 31), less noise is achieved since the charge uncertainty (kTC noise) of the read-out node 41 as well as all offset voltages are deducted.

If the pinned diode 15 is only slightly filled by the respective exposure process, no charges are transferred from the pinned diode 15 to the read-out node 41 in the first three read-out steps. The three capacitors 21-1, 21-2, 21-3 thus each contain the part-value voltage signal of the "empty" read-out node 41, i.e. the reference value voltage signal which is also stored in the reference value capacitor 21-R. The voltage at the output of the second amplifier 19 (channel B) therefore amounts to precisely a fraction to the amount of one quarter of the voltage at the output of the first amplifier 31 (channel A). In this case, the voltage at the output of the first amplifier 31 is used for determining the charge generated in the pinned diode 15 and the voltage at the output of the second amplifier 19 is ignored.

Figure 1A:
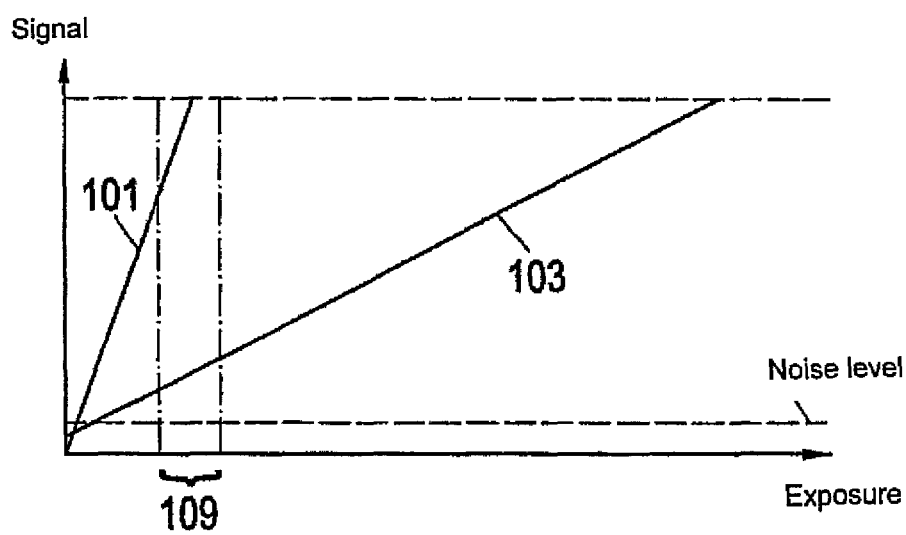
FIG. 1 exposure-signal characteristic of an image sensor having two channels with different gains.
Figure 1B:
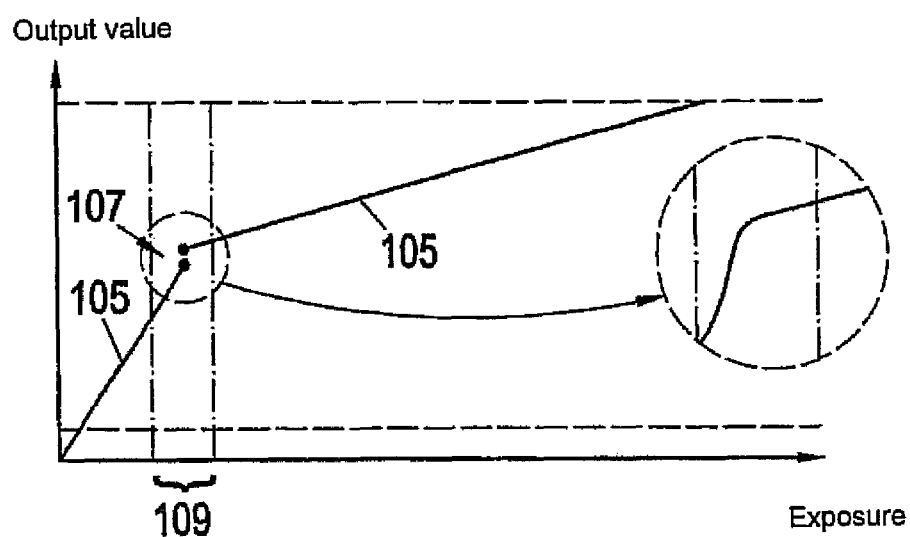

If the pinned diode is filled more, charges are transferred from the pinned diode 15 to the read-out node 41 at least two read-out steps, in particular at all four read-out steps. The capacitors 21-3, 21-4 or 21-2, 21-3, 21-4 or 21-1, 21-2, 21-3, 21-4 respectively thus contain the corresponding part-value voltage signals of the respective at least partly filled read-out node 41. The voltage at the output of the first amplifier 31 is invalid in this case and will be ignored since it does not represent the total charge generated in the pinned diode 15. Consequently, in this case, only the voltage at the output of the second amplifier 19 is used for the determining of the charge generated in the pinned diode 15. In a transition range, both signals can also be taken into account (cf. FIG. 1b).

The dynamics of the image sensor can be increased by the reading out of the image sensor in a plurality of read-out steps by a factor which corresponds to the number of read-out steps with respect to a read-out process including only one read-out step.

In the high-speed mode in accordance with FIG. 4, a reset 55 is in turn first carried out for a first-time fast read-out 65 of an image (see above). The first exposure process then starts, with the exposure time 77 (per row) amounting, for example, to only 2 ms. At the end of the exposure process, i.e. after the exposure time 77 of 2 ms in each case, the signals of the pixels 11 of the respective row are read out, with the signal of each pixel 11 being applied only at one of the two amplifiers 31, 19 of the respective column read-out circuit 13. The read-out 65 again takes place sequentially for the different rows, with the proportional fast reading out 67A or 67B respectively for a row now already being concluded in 0.9 μs. The reading out 65 in the example shown in FIG. 4 in turn lasts a total of 4 ms. A total of five read-outs 65 are shown in FIG. 4, with a reset ("emptying" of the pixels 11) taking place directly at the end of each read-out 65 so that the next exposure process starts immediately subsequent to a respective reading out 65. Signals are read out constantly in the high-speed mode (continuous hatching in FIG. 4).

To carry out the fast reading out 65 of an image, the signal of a pixel 11 of a row of the respective column (for example row 1) is first switched through to the one amplifier 19 or 31 of a column read-out circuit 13 and the signal of another pixel 11 of another row of the respective column (for example row 7) is switched through to the other amplifier 31 or 19 respectively of this column read-out circuit 13 directly thereafter. The two channels A and B of each column are thus used for different rows. The two amplifiers 31, 19 have the same gain factor in the high-speed mode, namely the normal gain factor of the second amplifier 31 from the normal mode. The two signals of two pixels 11 of two different rows applied at the outputs of the two amplifiers 31, 19 are then clocked out in parallel with a single read-out cycle. Two pixels 11 of different rows are thus clocked out in one channel in each case per read-out cycle and the pixels 11 of each image are read out in total in one channel.

This is a second operating manner of the respective column read-out circuit 13. To completely clock out the respective two rows (i.e. a total of 2×2880 pixels), a total of 90 read-out cycles is required, i.e. twice as many rows are clocked out in the 90 read-out cycles as in the first operating manner (normal mode). 64 pixels are therefore clocked out per read-out cycle. The duration of the 90 read-out cycles required for two rows is illustrated by a respective frame 73 in FIG. 4. A proportional fast reading out 67A takes place within this time 73 for a row by means of the channels A and a proportional fast reading out 67B takes place for another row by means of the channels B.

A voltage signal which is proportional to the charge generated during the exposure time 77 in the pixel 11 of the respective row can in particular be stored in the two capacitors 33-1, 33-2 of the respective channel A. Since the pixels 11 of a respective row are only read out in one channel in the high-speed mode, the second amplifier 19 is available for the voltage signals of the pixels 11 of another row which are respectively stored in the four capacitors 21-1, 21-2, 21-3, 21-4 of the respective channel B. The read-out speed for an image can hereby be increased.

It is generally also possible with the present arrangement, however, to read out charge generated during the exposure time 77 in the pixel 11 of the respective row in two read-out steps or two portions (cf. normal mode) to increase the dynamics. The first part charge of a pixel 11 of a row is then stored in the capacitor 33-1, the second part charge in the capacitor 33-2 and the first part charge of a pixel 11 of another row is in each case stored in the two capacitors 21-1, 21-2, the second part charge in each case in the capacitors 21-3, 21-4. The read-out process also includes only one read-out cycle for a respective pixel 11 in this case. It is ensured by a corresponding control of the voltage on the control line TRF that only the respective last read-out step allows a complete reading out of the charge present in the respective pixel 11 (cf normal mode).

The association of the rows to the two amplifiers 31, 19 for a respective read-out cycle is selected in the embodiment shown in FIG. 4 such that the reading out of two images following one another overlaps in time. In FIG. 4, e.g. the row 8 of a first image and the row 2 of a second image, the row 9 of the first image and the row 3 of the second image, the row 10 of the first image and the row 4 of the second image, etc. are each clocked out together. This is, however, not absolutely necessary. Two images following one another can instead be read out purely sequentially (i.e. not overlapping) in the high-speed mode, with the respective fast reading out 65 also being able to take place, differing from the representation in FIG. 4, at a halved duration. In this case, the proportional fast reading out 67A or 67B respectively of the different rows within an image takes place directly after one another, which corresponds to steeper "stairs" in FIG. 4, in which all proportional fast reading outs 67A and 67B respectively of an image take place directly after on another—irrespective of the order.

The high-dynamic mode in accordance with FIG. 5 is a mode which represents a mixed form of the first operating manner of the image sensor and of the second operating manner of the image sensor, i.e. of the normal mode and the high-speed mode. A reset 55 also first takes place at the start of the first exposure process in the high-dynamic mode in accordance with FIG. 5 (see above). Subsequently, during the ongoing exposure process, a first and a second fast partial intermediate reading out 69-1, 69-2 takes place (similar to the high-speed mode in accordance with FIG. 4), with the first and the second intermediate reading out 69-1, 69-2 having a time offset 79 of, for example, 0.5 ms to one another (for each row, i.e. for the two proportional fast partial intermediate reading outs 71A and 71B) so that a total duration results for the two-time intermediate reading out of 4.5 ms (start of 69-1 to end of 69-2). A normal read-out 61 (corresponding to the normal mode in accordance with FIG. 3) takes place at the end of the exposure process. A respective waiting period 75 having a duration of, for example, 0.75 ms is present between the reset block 55 and the intermediate read-out block 69 as well as between the intermediate read-out block 69 and the normal read-out block 61. The exposure time 77 in turn amounts to 10 ms.

The first intermediate read-out 69-1 and the second intermediate read-out 69-2 take place in the second operating manner of the image sensor; the normal read-out 61 in the first operating manner of the image sensor, with the first intermediate read-out 69-1 and the second intermediate read-out 69-2 overlapping one another in time. The reading out process for a respective pixel includes a total of three read-out cycles, i.e. the signals which are applied at the respective amplifier 31 or 19 on the first intermediate read-out 69, the signals which are applied at the respective amplifier 31 or 19 on the second intermediate read-out 69-2 and the signals which are applied at the two amplifiers 31, 19 on the normal read-out 61 are clocked out in each case.

Whereas the first intermediate read-out 69-1 and the second intermediate read-out 69-2 overlap, twice the number of rows (as in the high-speed mode) are clocked out than on the normal read-out 61 at the end of the exposure process. The duration of the 90 read-out cycles required for two rows is illustrated by a respective frame 73 in accordance with FIG. 4. A proportional fast partial intermediate read-out 71A takes place within this duration 73 for a row by means of the channels A and a proportional fast partial intermediate read-out 71B takes place for another row by means of the channels B. The pixels 11 of a respective row are only read out in one channel during the intermediate read-out 69. The two amplifiers 19, 31 or the two channels A, B of each column read-out circuit 13 are thus available for different rows.

The first intermediate read-out 69-1 and the second intermediate read-out 69-2 take place in the middle of the ongoing exposure for an image. A single read-out value is then determined from the signals for a respective pixel 11 clocked out at the three different points in time and represents the charge generated in the respective pixel 11 during a single exposure process. The high-dynamic mode differs in this from the normal mode in which the explained individual charge transfers are only carried out at the end of the exposure process or after the exposure process.

The charge generated in the pixel 11 of the respective row can also be read out in two read-out steps or in two portions in the intermediate reading outs 69-1, 69-2. Unlike the fast intermediate read-out 65 in the high-speed mode, the first intermediate read-out 69-1 and the second intermediate read-out 69-2 take place in the high-dynamic mode, however, such that no complete read-out of the charge present in the respective pixel 11 takes place in the respective intermediate read-out 69-1, 69-2. If the first and/or second intermediate read-out 69-1, 69-2 take(s) place as explained above in two read-out steps (corresponding to the normal mode in accordance with FIG. 3), the same voltage is preferably applied at the transfer gate 39 for the two read-out steps, i.e. the transfer gate 39 is opened equally far for both read-out steps.

Furthermore, the normal read-out 61 of the high-dynamic mode differs from the normal read-out 61 of the normal mode in accordance with FIG. 3 in that only a single read-out step is carried out with which the charge present in the respective pixel 11 at this time is completely read out. However, the normal read-out 61-2 also takes place in two channels in the high-dynamic mode, namely with different gain factors.

The charge quantity which can be read out overall from the respective pixel 11 during a single exposure process and thus the dynamics of the image sensor can be considerably increased by the two-time intermediate read-out. The high-dynamic mode requires longer minimal exposure times than the normal mode.

Figure 6:
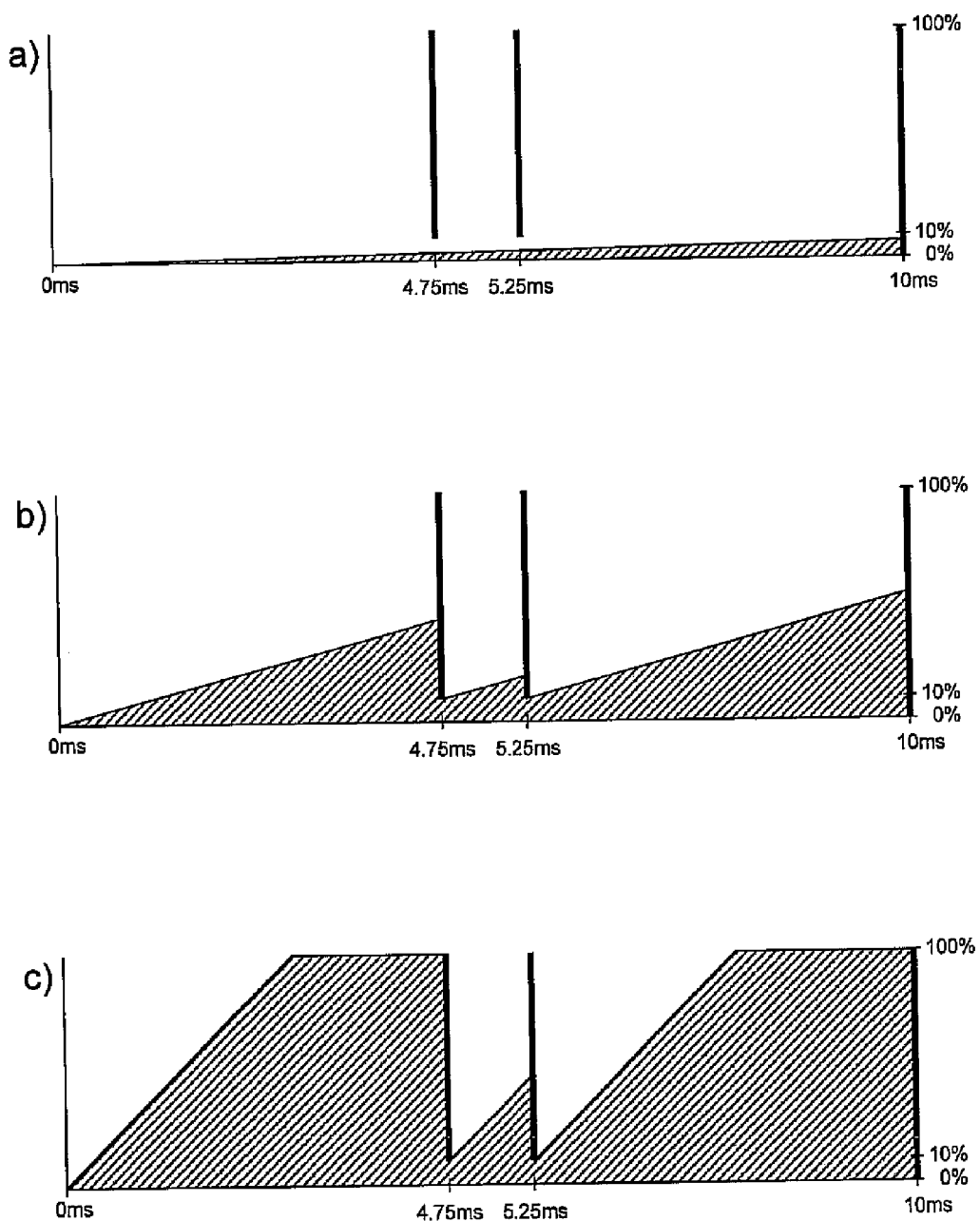
FIG. 6 the time development of the charge present in the detector element of FIG. 2 during a single exposure process, at different exposure levels.

In FIG. 6, the three aforesaid reading outs, i.e. the two intermediate reading outs 69-1, 69-2 and the normal read-out 61, are shown for a row of a pixel 11 in connection with the time development of the charge present in the pinned diode 15 beyond a single exposure. A reset takes place at the time 0. The pixel 11 is partially intermediately read out a first time at the time 4.75 ms. The pixel 11 is partially intermediately read out a second time at the time 5.25 ms. The pixel 11 is read out normally, i.e. completely, at the time 10 ms.

The charge present in the pinned diode 15 is entered on the ordinate. The saturation limit of the pinned diode 15 is reached at 100%. On each read-out or on each read-out cycle following it, the transfer gate 39 is temporarily opened to make it possible that charge can be transferred from the pinned diode 15 into the read-out node 41.

In the normal read-out 61 at 10 ms, the transfer gate 39 is completely opened so that the total charge present in the pinned diode 15 at this time can be transferred into the read-out node 41. The complete opening of the transfer gate 39 at 10 ms is illustrated by a perpendicular bar in FIG. 6 which extends over the total ordinate axis, i.e. over the total range from 0% to 100%.

At the read-out times 4.75 ms and 5.25 ms, in contrast, the transfer gate 39 is not completely opened, but only partly opened, i.e. no charge is transferred into the read-out node 41 when the pinned diode 15 only contains very little charge at the respective time. In the example selected, only that portion of the charge currently contained in the pinned diode 15 can be transferred which exceeds a degree of filling of the pinned diode 15 by 10%. This is illustrated in each case by a perpendicular bar at the times 4.75 ms and 5.25 ms which only extends over the range from 10% to 100% of the ordinate axis. If the pinned diode 15, for example, contains 40% of the maximum possible charge, only 30% of the maximum possible charge is transferred on a read-out with an only partial opening of the transfer gate 39.

Since charge is only transferred in the two intermediate reading outs at the times 4.75 ms and 5.25 ms when the pinned diode 15 is filled to more than 10%, it can be recognized solely with reference to the last read-out at the time 10 ms (normal read-out) whether charge was transferred at the intermediate reading outs which had previously taken place. If it was recognized that no charge was transferred at the two intermediate reading outs at the times 4.75 ms and 5.25 ms, the read-out results of these two reading outs obtained on the clocking out can be ignored in the determination of a read-out value for the charge generated in the respective pixel 11 during the ongoing charge generation in a single exposure process. Since ultimately thus only a single reading out is evaluated, an increase in the thermal noise, which otherwise increases with the root of the number of evaluated reading outs, can be avoided at a low exposure.

At low exposure, only very little charge is generated during the exposure process in the pinned diode 15, as is shown in FIG. 6a. The time period of the exposure process which is used as the basis for determining the aforesaid read-out value corresponds to the time period from 0 ms to 10 ms.

At a mean exposure (FIG. 6b), charges are transferred at all three reading outs and none of the corresponding read-out results is overdriven. In this case, all read-out results are used for determining the aforesaid read-out value, i.e. the total charge generated in the pinned diode 15 detector element is read out and contributes to the production of the read-out results. The sum of the three read-out results is in particular calculated for this purpose. The time period of the exposure process which is used as the basis for determining the aforesaid read-out value corresponds to the time period from 0 ms to 10 ms.

At a relatively high exposure (FIG. 6c), the read-out result of at least the third read-out is overdriven at 10 ms. The read-out result of the second reading out at 5.25 ms is, however, not overdriven. Since the charge present in the pinned diode 15 at this time is deleted down to 10% charge by the first reading out at 4.75 ms, the charge quantity which is present in the second read-out and exceeds 10% charge must necessarily have arisen in the 0.5 ms between the first reading out and the second reading out. A substantially higher exposure can be evaluated by the considerably reduced effective exposure time (from 10 ms to 0.5 ms). An overdrive only occurs at approximately 2,000% brightness.

The time period of the exposure process which is used as the basis for the determining of the aforesaid read-out value, i.e. the effective exposure time, therefore amounts either to 10 ms (FIG. 6a, b) or 0.5 ms (FIG. 6c). The time center in each case is at 5 ms for both time periods. Since the time center of the effective exposure time at the transition from a situation in accordance with FIGS. 6a, b to a situation in accordance with FIG. 6c is not changed, only different movement blurs occur with moved motifs, but no different positions in the image.

In the high-dynamic mode, four separate read-out results are present per pixel or pixel signal, namely a first intermediate read-out result (of the first fast partial intermediate read-out 69-1) with a normal gain, a second intermediate read-out result (of the second fast partial intermediate read-out 69-2) with a normal gain, a third closing read-out result (of the normal read-out 61) with a normal gain (via the second amplifier 31 or channel B) and a fourth closing read-out result (of the normal read-out 61) with a high gain (via the first amplifier 19 or channel A). In the case in accordance with FIG. 6a, the fourth read-out result (high gain) is used as the output value for the respective underlying pixel signal. In the case in accordance with FIG. 6b, a read-out value is used as the output value which, as explained above, is determined from the two intermediate read-out results and the third read-out result (normal gain). In the case in accordance with FIG. 6c, the second intermediate read-out is used as the output value.

An image sensor can be operated in a multiple of operating manners through the present invention. If a high frame rate is desired, the image sensor can be operated in the high-speed mode (with a dynamic range reduced with respect to the normal mode). If high dynamics are desired, the image sensor can be operated in the high-dynamic mode (with a minimal exposure time longer with respect to the normal mode).

The invention claimed is:

1. An image sensor for electronic cameras, comprising:
a plurality of light sensitive pixels arranged in rows and columns for generating exposure proportional signals, wherein the pixels of a respective column are coupled via at least one respective column line to at least one respective column read-out circuit, and wherein the respective column read-out circuit includes at least two column amplifiers connected in parallel; and
a control device for controlling a read-out of an image, wherein a read-out process for a respective pixel includes at least one read-out cycle;
wherein the gain factor of at least one of the two column amplifiers of the respective column read-out circuit is adjustable; and
wherein the image sensor includes a first operating manner and a second operating manner, wherein in the first operating manner the two column amplifiers have different gain factors for a respective read-out cycle and the signal of a pixel of a row is amplified by the two different gain factors, and wherein in the second operating manner the two column amplifiers have the same gain factor for a respective read-out cycle and the signals of two pixels of two different rows are amplified by the same gain factor,
wherein the image sensor includes at least two of the following operating modes:
a normal mode in which the image sensor is operated only in the first operating manner;
a high-speed mode in which the image sensor is operated only in the second operating manner; and
a high-dynamic mode in which the image sensor is first operated in the second operating manner and subsequently in the first operating manner.

2. An image sensor in accordance with claim 1, wherein the read-out process for a respective pixel includes a single read-out cycle in the normal mode, a single read-out cycle in the high-speed mode and a plurality of read-out cycles in the high-dynamic mode.

3. An image sensor in accordance with claim 1, wherein the high-dynamic mode includes at least two read-out cycles in the second operating manner and only one read-out cycle in the first operating manner.

4. An image sensor in accordance with claim 1, wherein, in the high-dynamic mode, only one last read-out cycle, in which the image sensor is operated in the first operating manner, allows a complete read-out of the charge present in the pixel.

5. An image sensor in accordance with claim 1, wherein the column read-out circuit includes a plurality of signal stores for exposure signals, with at least one signal store for exposure signals being connected before the first of the two column amplifiers and at least two signal stores for exposure signals being connected before the second of the two column amplifiers.

6. An image sensor in accordance with claim 5, wherein at least two signal stores for exposure signals are connected before the first of the two column amplifiers and at least four signal stores for exposure signals are connected before the second of the two column amplifiers, with the at least two signal stores for exposure signals being connected in parallel to one another and with the at least four signal stores for exposure signals being connected in parallel to one another.

7. An image sensor in accordance with claim 5, wherein the sum of the capacities of the at least one signal store for exposure signals connected before the first column amplifier corresponds to the sum of the capacities of the at least two signal stores for exposure signals connected before the second column amplifier.

8. An image sensor in accordance with claim 5, wherein the at least two signal stores for exposure signals connected before the second column amplifier each have the same capacity.

9. An image sensor in accordance with claim 5, wherein at least one signal store for a reference signal is connected before the two column amplifiers.

10. An image sensor in accordance with claim 9, wherein a separate signal store for a reference signal is connected before each of the two column amplifiers, with the capacity of the signal store for a reference signal connected before the first column amplifier corresponding to the sum of the capacities of the signal stores for exposure signals connected before the first column amplifier and with the capacity of the signal store for a reference signal connected before the second column amplifier corresponding to the sum of the capacities of the signal stores for exposure signals connected before the second column amplifier.

11. An image sensor in accordance with claim 5,
wherein the column read-out circuit includes first switch means to selectively connect the respective column line to one or to a plurality of the signal stores.

12. An image sensor in accordance with claim 5,
wherein the column read-out circuit includes second switch means to connect the signal stores for exposure signals associated with the first column amplifier together to the first column amplifier or to connect the signal stores for exposure signals associated with the second column amplifier together to the second column amplifier.

13. An image sensor in accordance with claim 5,
wherein the control device is adapted to read out from the pixel the charge generated for the respective read-out cycle in the pixel in a plurality of read-out steps, and thus in a plurality of portions, to store part-value measured signals proportional to the individual charge portions separately from one another in the signal stores for exposure signals connected before the first or the second column amplifier.

14. An image sensor in accordance with claim 13,
wherein in the normal mode the read-out process for a respective pixel includes a single read-out cycle, with the control device being adapted to store the part-value measured signals proportional to the individual charge portions separately from one another in the at least two signal stores connected before the second column amplifier and to store the part-value measured signal associated with the last read-out step additionally in the at least one signal store connected before the first column amplifier.

15. An image sensor in accordance with claim 13,
wherein in the high-dynamic mode a plurality of read-out steps only take place in the second operating manner.

16. An image sensor in accordance with claim 13,
wherein in the normal mode or in the high-speed mode only the last read-out step allows a complete read-out of the charge present in the pixel.

17. An image sensor in accordance with claim 13,
wherein the number of the signal stores for exposure signals connected before the second column amplifier corresponds to the number of read-out steps.

18. An image sensor in accordance with claim 5,
wherein in the high-dynamic mode the read-out process for a respective pixel includes a plurality of read-out cycles, with the read-out cycle or read-out cycles lying before the last read-out cycle taking place during the exposure process for the image, and with the control device being adapted to read out the charge generated in the pixel for the respective read-out cycle from the pixel in a plurality of read-out steps, and thus in a plurality of portions, to store a measured signal proportional to the charge in the at least one signal store for exposure signals connected before the first column amplifier or in the at least two signals stores for exposure signals connected before the second column amplifier.

19. An image sensor in accordance with claim 18,
wherein the number of read-out cycles is an odd number.

20. An image sensor in accordance with claim 18,
wherein at least one pair or one respective pair of read-out cycles lying before the last read-out cycle is symmetrically distributed about the time center of a respective exposure process.

21. An image sensor in accordance with claim 1,
wherein the control device is adapted to vary a control pulse applied to the pixel in order selectively to allow a partial or complete reading out of the charge present in the pixel.

22. An image sensor in accordance with claim 1,
wherein the control circuit is adapted to clock out two images in a time-overlapping manner in the second operating manner.

23. An image sensor in accordance with claim 1,
wherein the control device is adapted to clock out the signals of the pixels of two different rows of different images in the second operating manner.

24. An image sensor in accordance with claim 1,
wherein said two different rows in the second operating manner do not follow directly after one another or have a constant row spacing from one another.

25. An image sensor in accordance with claim 1,
wherein the control device is adapted to selectively control the image sensor in accordance with the normal mode in which the image sensor is only operated in the first operating manner or in accordance with the high-speed mode in which the image sensor is only operated in the second operating manner.

26. An image sensor in accordance with claim 1,
wherein the control device is adapted to selectively control the image sensor in accordance with the normal mode in which the image sensor is only operated in the first operating manner or in accordance with the high-dynamic mode in which the image sensor is first operated in the second operating manner and subsequently in the first operating manner.

27. An image sensor in accordance with claim 1,
wherein the control device is adapted to selectively control the image sensor in accordance with the high-speed mode in which the image sensor is only operated in the second operating manner or in accordance with the high-dynamic mode in which the image sensor is first operated in the second operating manner and subsequently in the first operating manner.

28. A method for reading out an image sensor for electronic cameras, wherein the image sensor includes a plurality of light sensitive pixels arranged in rows and columns for generating exposure proportional signals and a control device for controlling a read-out of an image, wherein the pixels of a respective column are coupled via at least one respective column line to at least one respective column read-out circuit, wherein the respective column read-out circuit includes at least two column amplifiers connected in parallel, wherein a read-out process for the respective pixel includes at least one read-out cycle, wherein the gain factor of at least one of the two column amplifiers of the respective column read-out circuit is adjustable, and wherein the respective column read-out circuit is switched between a first operating manner and a second operating manner, wherein in the first operating manner the two column amplifiers have different gain factors for a respective read-out cycle and the signal of a pixel of a row is amplified by two different gain factors, and wherein in the second operating manner the two column amplifiers have the same gain factor for a respective read-out cycle and the signals of two pixels of two different rows are amplified by the same gain factor, wherein the image sensor includes at least two of the following operating modes:
a normal mode in which the image sensor is operated only in the first operating manner;
a high-speed mode in which the image sensor is operated only in the second operating manner; and
a high-dynamic mode in which the image sensor is first operated in the second operating manner and subsequently in the first operating manner.

* * * * *